(12) United States Patent
Haney et al.

(10) Patent No.: US 10,610,055 B2
(45) Date of Patent: Apr. 7, 2020

(54) FOOD PROCESSOR NON-CONTACT INTERLOCK

(71) Applicant: WHIRLPOOL CORPORATION, Benton Harbor, MI (US)

(72) Inventors: Edward Haney, Baroda, MI (US); Andria R. Nyenhuis, Cleveland, TN (US); Mitchell L. Robertson, Elkhart, IN (US); Joseph Snyder, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 671 days.

(21) Appl. No.: 15/271,336

(22) Filed: Sep. 21, 2016

(65) Prior Publication Data

US 2018/0078094 A1    Mar. 22, 2018

(51) Int. Cl.
*A47J 43/07*     (2006.01)
*A47J 43/046*    (2006.01)

(52) U.S. Cl.
CPC ......... *A47J 43/0777* (2013.01); *A47J 43/046* (2013.01); *A47J 43/075* (2013.01); *A47J 43/0761* (2013.01); *A47J 43/0772* (2013.01)

(58) Field of Classification Search
CPC .. A47J 43/0777; A47J 43/0761; A47J 43/075; A47J 43/0772; A47J 43/046
See application file for complete search history.

(56) References Cited

U.S. PATENT DOCUMENTS

| | | | | |
|---|---|---|---|---|
| 3,746,285 A | * | 7/1973 | Mango | B64B 1/62 116/210 |
| 4,396,186 A | * | 8/1983 | Solie | B23Q 3/108 269/310 |
| 4,523,720 A | | 6/1985 | Behringer et al. | |
| 4,629,131 A | * | 12/1986 | Podell | A47J 43/046 241/199.12 |
| 4,663,540 A | * | 5/1987 | Ferrante | H01H 36/02 200/230 |
| 4,731,118 A | | 3/1988 | Svilar et al. | |

(Continued)

FOREIGN PATENT DOCUMENTS

FR    2718002 A1    10/1995
GB    2093553 A1     9/1982

*Primary Examiner* — Sean M Michalski
(74) *Attorney, Agent, or Firm* — Price Heneveld LLP

(57) ABSTRACT

A food processing container includes a food processing chamber and a cover assembly with a latch mechanism operable between latched and unlatched positions. The latch mechanism includes a first magnetic member disposed therein. An interlock assembly is disposed outside of and adjacent to the food processing chamber and includes a sealed cavity with a plunger member moveable disposed within the sealed cavity. The plunger is operable between at-rest and actuated positions within the sealed cavity and includes upper and lower magnetic members disposed at opposite ends of the plunger member. The plunger member moves to the actuated position as the latch mechanism moves to the latched position due to a repulsion force between the first magnetic member and the upper magnetic member, and further wherein the lower magnetic member moves into the lower portion of the sealed cavity as the latch mechanism moves to the latched position.

17 Claims, 6 Drawing Sheets

(56) References Cited

U.S. PATENT DOCUMENTS

| | | | | |
|---|---|---|---|---|
| 4,741,482 A * | 5/1988 | Coggiola | A47J 43/046 | 241/282.1 |
| 4,821,968 A | 4/1989 | Fleche | | |
| 5,071,077 A * | 12/1991 | Arroubi | A47J 43/06 | 241/282.2 |
| 5,454,299 A * | 10/1995 | Gonneaud | A47J 43/0777 | 241/37.5 |
| 5,486,050 A * | 1/1996 | Lenting | A47J 43/046 | 241/199.12 |
| 5,957,577 A * | 9/1999 | Dickson | A47J 43/07 | 366/197 |
| 6,540,394 B2 * | 4/2003 | Juriga | A47J 43/0766 | 241/37.5 |
| 6,554,466 B1 * | 4/2003 | Lee | A47J 43/046 | 241/37.5 |
| 6,907,819 B2 * | 6/2005 | Kernan | A47J 43/0777 | 241/36 |
| 7,028,930 B2 * | 4/2006 | Carnevale | A47J 43/0777 | 241/278.1 |
| 7,520,453 B2 * | 4/2009 | Clapp | A47J 43/0772 | 241/282.1 |
| 9,010,668 B2 * | 4/2015 | Garcia | A47J 43/0777 | 241/36 |
| 9,084,508 B2 * | 7/2015 | Sandford | A47J 43/0722 | |
| 2003/0205635 A1 * | 11/2003 | Lazzer | A47J 43/0777 | 241/37.5 |
| 2006/0207584 A1 * | 9/2006 | Yeh | F41B 11/62 | 124/45 |
| 2010/0308142 A1 * | 12/2010 | Krasznai | A47J 43/0772 | 241/36 |
| 2011/0248108 A1 * | 10/2011 | Carriere | A47J 43/0722 | 241/33 |
| 2013/0001340 A1 | 1/2013 | Hidalgo et al. | | |
| 2014/0299690 A1 * | 10/2014 | Zakowski | A47J 43/0716 | 241/100 |
| 2014/0322411 A1 * | 10/2014 | Segurola | A23L 5/20 | 426/443 |
| 2016/0309960 A1 * | 10/2016 | Kolar | A47J 43/046 | |
| 2018/0020875 A1 * | 1/2018 | Kolar | A47J 43/0766 | 366/279 |
| 2019/0000275 A1 * | 1/2019 | Sapire | A47J 36/10 | |

* cited by examiner

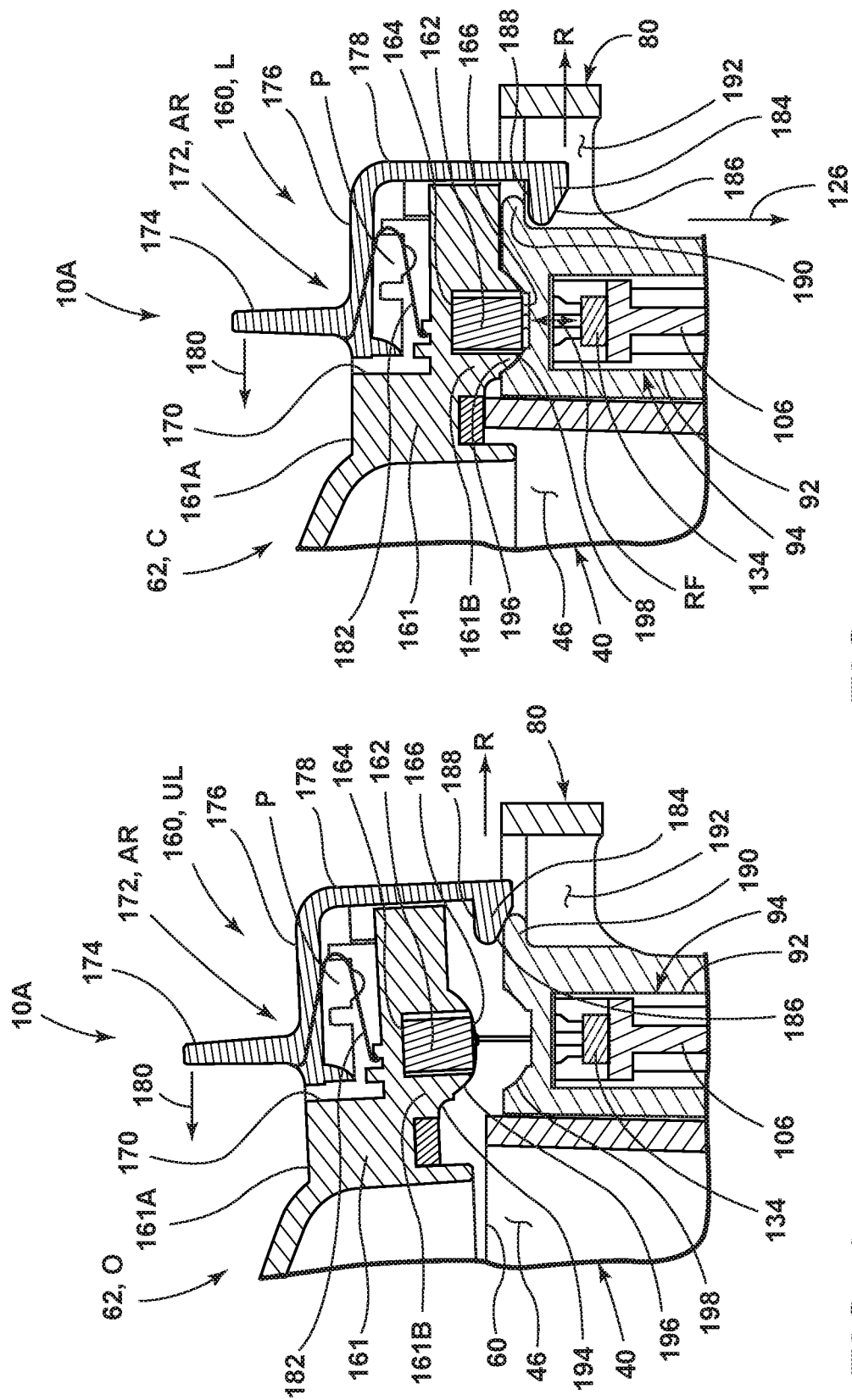

FOOD PROCESSOR NON-CONTACT INTERLOCK

BACKGROUND

An interlock is a safety mechanism which generally prevents a motor of an appliance from running while a lid or cover of a food processor or blender jar is not properly seated on the jar. There are a number of mechanical solutions that are used to provide an interlock safety mechanism on a food processor. However, many of the mechanical solutions available today are susceptible to contact with liquids, food substrates, and other mixtures of ingredients that are processed within a processing chamber of a food processor appliance. Therefore, food and water can become trapped in these mechanical interlock mechanisms which can impede the functionality of the interlock and is also difficult to clean. As such, a non-contact or sealed interlocking system is desired to provide the reliability and cleanliness desired in a food processing appliance.

SUMMARY

One aspect of the present concept includes a food processing container having a base portion and a food processing chamber with an open top and a sidewall upwardly extending from the base portion. A cover assembly is configured to close the open top of the food processing chamber and includes a latch mechanism operable between latched and unlatched positions. A first magnetic member is part of the latch mechanism and is operable between first and second positions as the latch mechanism moves between the latched and unlatched positions. An interlock assembly is disposed outside of and adjacent to the food processing chamber and includes a sealed cavity having upper and lower portions. A plunger member is moveable disposed within the sealed cavity and includes first and second ends. The plunger is operable between at-rest and actuated positions within the sealed cavity. An upper magnetic member is disposed on the first end of the plunger member, and a lower magnetic member is disposed on the second end of the plunger member. In use, the plunger member moves to the actuated position as the latch mechanism moves to the latched position due to a repulsion force between the first magnetic member of the latch mechanism and the upper magnetic member of the plunger. The lower magnetic member moves into the lower portion of the sealed cavity as the latch mechanism moves to the latched position.

Another aspect of the present concept includes an appliance for processing food, which includes a base unit having a housing with an upper support surface. A motor and an electric control circuit for the motor are disposed within the housing of the base unit. The electric control circuit having a magnetically controlled switch with a detection zone extending outside of the base unit. A container includes a base portion and a food processing chamber, wherein the base portion is supported on the upper support surface of the base unit when the container is positioned in a working position on the base unit. A cover assembly for covering the food processing chamber includes a latch mechanism having a first magnetic member operable between first and second positions as the latch mechanism moves between latched and unlatched positions. A sealed cavity is disposed adjacent to the food processing chamber. A plunger member is disposed within the sealed cavity and includes first and second ends. The plunger is operable between at-rest and actuated positions within the sealed cavity. An upper magnetic member is disposed on the first end of the plunger member, and a lower magnetic member is disposed on the second end of the plunger member. The plunger member moves to the actuated position as the latch mechanism moves to the latched position due to a repulsion force between the first magnetic member of the latch mechanism and the upper magnetic member of the plunger. The lower magnetic member moves into the detection zone of the magnetically controlled switch to close the switch and the electric control circuit when the plunger is in the actuated position.

Yet another aspect of the present concept includes an appliance for processing food having a base unit with a housing. A motor and an electric control circuit are disposed within the housing of the base unit. The electric control circuit includes a magnetically controlled switch with a detection zone extending outside of the base unit. A container having a food processing chamber and a sealed cavity is disposed above the magnetically controlled switch when the container is positioned in a working position on the base unit. A cover assembly includes a latch mechanism to latch the cover assembly to the container over the food processing chamber. The cover assembly also includes a first magnetic member operable between first and second positions as the cover assembly moves vertically between the open and closed positions. A plunger member is disposed within the sealed cavity and includes upper and lower magnetic members disposed on opposite ends thereof. The plunger is operable between at-rest and actuated positions within the sealed cavity. The first magnetic member of the cover assembly aligns with the upper magnetic member of the plunger when the cover assembly is in the closed position. The first magnetic member repels the upper magnetic member of the plunger under a repulsion force to move the plunger to the actuated position within the sealed cavity when the cover assembly is in the closed position. The lower magnetic member moves into the detection zone of the magnetically controlled switch to close the switch and the electric control circuit when the plunger is in the actuated position.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 6 is a fragmentary cross-sectional view of a food processor having a latch mechanism in an unlatched position; and FIG. 7 is a fragmentary cross-sectional view of the food processor of FIG. 6 showing the latch mechanism in a latched position.

DETAILED DESCRIPTION OF EMBODIMENTS

Figure 1:
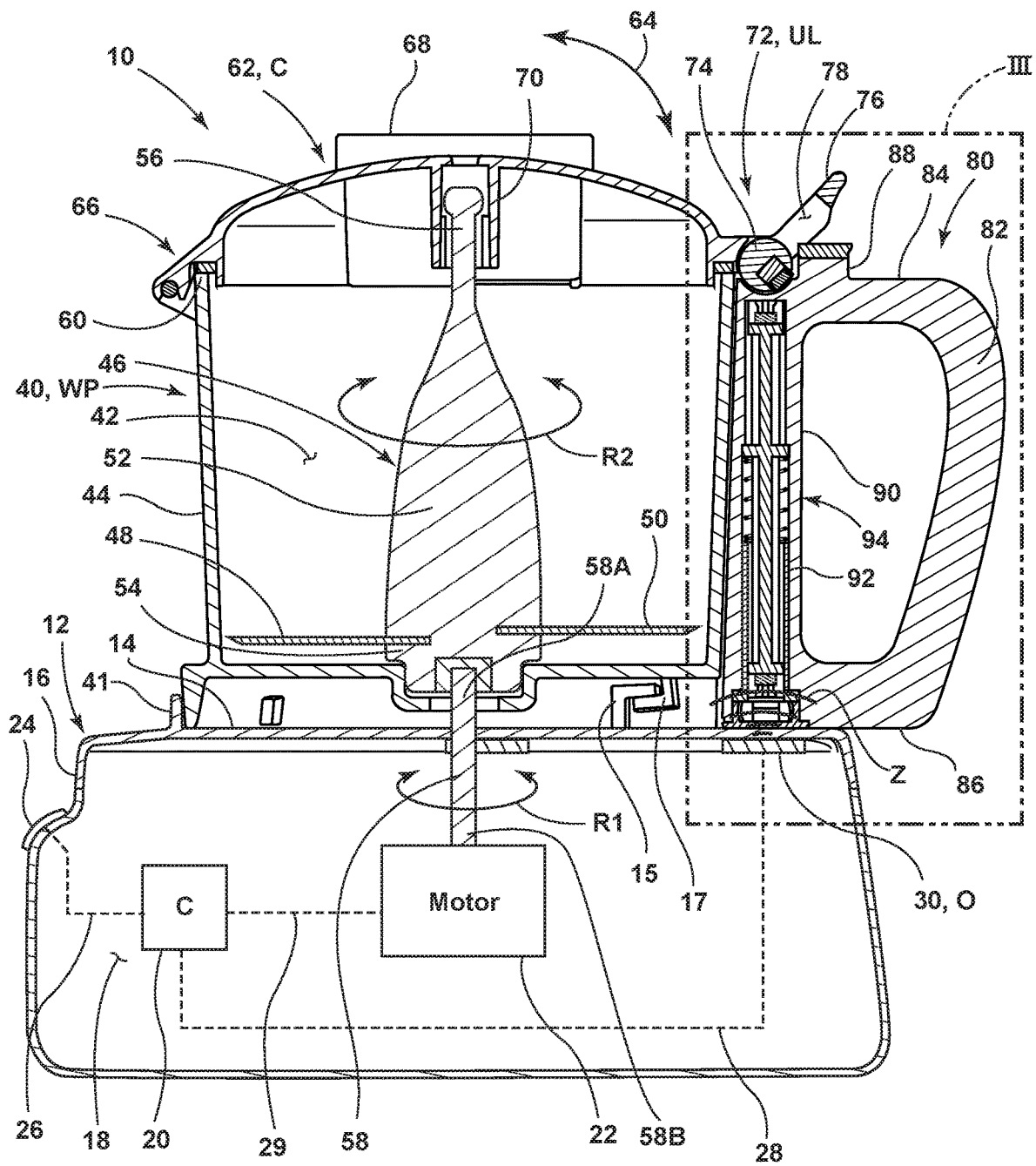
FIG. 1 is a cross-sectional view of a food processor having an interlock system in a first position.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a food processor 10 is shown having a base unit 12 with an upper support surface 14 disposed thereon. The base unit 12 generally defines a housing 16 having an interior cavity 18 in which a controller 20 and a motor 22 are disposed. A user interface 24 is disposed on an outside surface of the base unit 12 and is configured to provide inputs from a user for initiating a food processing sequence. The controller 20 is shown coupled to the user interface 24 via lead 26. A second lead 28 electronically couples the controller 20 with a switch 30. The switch 30 may be a Hall effect sensor or a reed switch that is disposed directly below the upper support surface 14 of the base unit 12. The switch 30 is used to sense a proper positioning of a cover assembly 62 of the food processor 10, and is further configured to send an activation signal to the controller 20 via lead 28. When this activation signal is received by the controller 20, the controller 20 is configured to provide power to the motor 22 via lead 29. The switch 30 is operable between open and closed conditions and is contemplated to be in the open condition O in FIG. 1. The switch 30 moves to the closed condition C (FIG. 2) in response to the detection of an applied magnetic field. Thus, when a magnetic field is detected in a zone of detection Z of the switch 30, the switch 30 will move to the closed condition C to close a circuit between the switch 30, the controller 20 and the motor 22, thereby allowing the motor 22 to operate and drive the food processor 10. In this way, the switch 30 is a magnetically controlled switch.

As further shown in FIG. 1, the food processor 10 further includes a container 40 having a food processing chamber 42 defined by a sidewall 44 of the container 40. A base portion 41 of the container 40 is supported on the upper support surface 14 of base unit 12 and is retained thereon by engagement of locking features 15, 17 of the base unit 12 and container 40, respectively. The sidewall 44 extends upwardly from the base portion 41 to an open top portion 60. A food processing tool 46 is shown disposed within the food processing chamber 42 and includes first and second blade assemblies 48, 50 disposed on an axle 52. The axle 52 includes a lower portion 54 and an upper portion 56. The lower portion 54 is configured to be received on a spindle 58 at an upper portion 58A thereof. A lower portion 58B of the spindle 58 is coupled to the motor 22 to drive the spindle 58 in the direction indicated by arrow R1, and is coupled to the food processing tool 46 to drive the tool 46 in a direction as indicated by arrow R2.

As further shown in FIG. 1, the container 40 includes the open top portion 60 having a lid or cover assembly 62 disposed thereon. The lid or cover assembly 62 is operable between open and closed positions in the direction as indicated by arrow 64. The cover assembly 62 is configured for vertical pivoting movement along the path as indicated by arrow 64 due to a hinged coupling 66 disposed between the container 40 and the cover assembly 62. In FIG. 1, the cover assembly 62 is shown in a closed position C relative to the open top 60 of the container 40. In the closed position C, the cover assembly 62 has moved downward on to the food processing chamber 42 to effectively close the open top 60 of the food processing chamber 42. Once in place in the closed position C, the cover assembly 62 is not twist locked into place, but rather latched in place as further described below. The cover assembly 62 is shown in FIG. 1 as a hinged cover assembly, however, a set-in-place cover assembly may also be used with the present concept.

In the embodiment shown in FIG. 1, the cover assembly 62 includes a feed chute 68 that is used to introduce ingredients into the food processing chamber 42 during a food processing sequence. Further, the cover assembly 62 includes a downwardly extending guide 70 that is configured to receive the upper portion 56 of the axle 52 of the food processing tool 46. In this way, the axle 52 of the food processing tool 46 is positively retained between the spindle 58 and the cover assembly 62 during a food processing sequence. Thus, the food processing tool 46 is configured for rotation within the food processing chamber 42 in the direction as indicated by arrow R2 as powered by the motor 22. The cover assembly 62 further includes a latch mechanism 72 having a rotatable base portion 74 and an outwardly extending engagement flange 76. The engagement flange 76 includes a recess 78 disposed therethrough which is configured to receive an engagement member 88 of a handle assembly 80 when the latch assembly 72 is in a latched position. In FIG. 1, the latch assembly 72 is shown in an unlatched position UL.

With further reference to FIG. 1, a handle assembly 80 is shown extending outwardly from the sidewall 44 of the container 40. The handle assembly 80 includes a handle portion 82 having an upper portion 84 and a lower portion 86. The upper portion 84 includes the upwardly extending engagement member 88 disposed thereon. The handle assembly 80 further includes a base portion 90 that is disposed directly adjacent to the sidewall 44 of the container 40. The base portion 90 of the handle assembly 80 includes a cavity 92, which houses an interlock system 94 therein. The cavity 92 is contemplated to be a sealed cavity as further described below with particular reference to FIGS. 3 and 4. The interlock system 94 is used to selectively provide power to the motor 22 when the container 40 is properly positioned on the base unit 12 and the latch mechanism 72 is in a latched position, as further described below.

Figure 2:
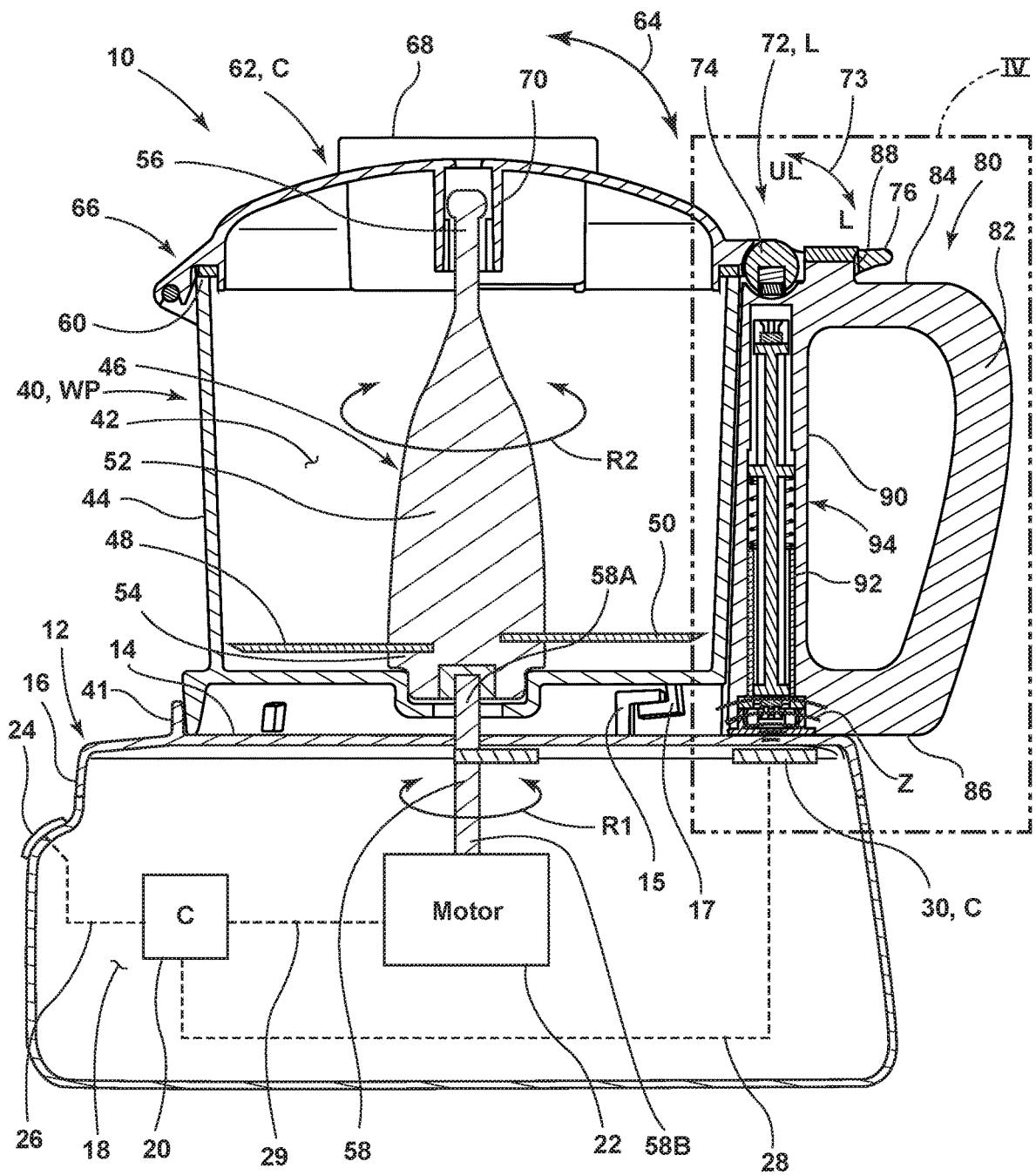
FIG. 2 is a cross-sectional view of the food processor of FIG. 1 showing the interlock system in a second position.

Referring now to FIG. 2, the latch mechanism 72 is shown rotated downward along the path indicated by arrow 73 from the unlatched position UL (FIG. 1), to a latched position L. In the latched position L, the engagement member 88 of the handle assembly 80 is received in the recess 78 of the latch mechanism 72 for coupling the latch mechanism 72 to a portion of the handle assembly 80 and retaining the cover assembly 62 in the closed position C. For movement of the latch mechanism 72 between the latched position L and the unlatched position UL, a user will engage the engagement flange 76 to rotate the latch mechanism 72 at a rotating base portion 74 to a desired position. As further described below, the position of the latch mechanism 72 dictates the condition of the interlock system 94, as further described below.

With further reference to FIGS. 1 and 2, the container 40 is shown positioned in a working position WP on the base unit 12. When the container 40 is in the working position WP on the base unit 12, the interlock system 94 is disposed directly above the magnetically controlled switch 30 disposed within the base unit 12. As further shown in FIGS. 1 and 2, the magnetically controlled switch 30 includes a zone of detection Z which extends outside of the base unit 12 through the housing 16.

Figure 3:
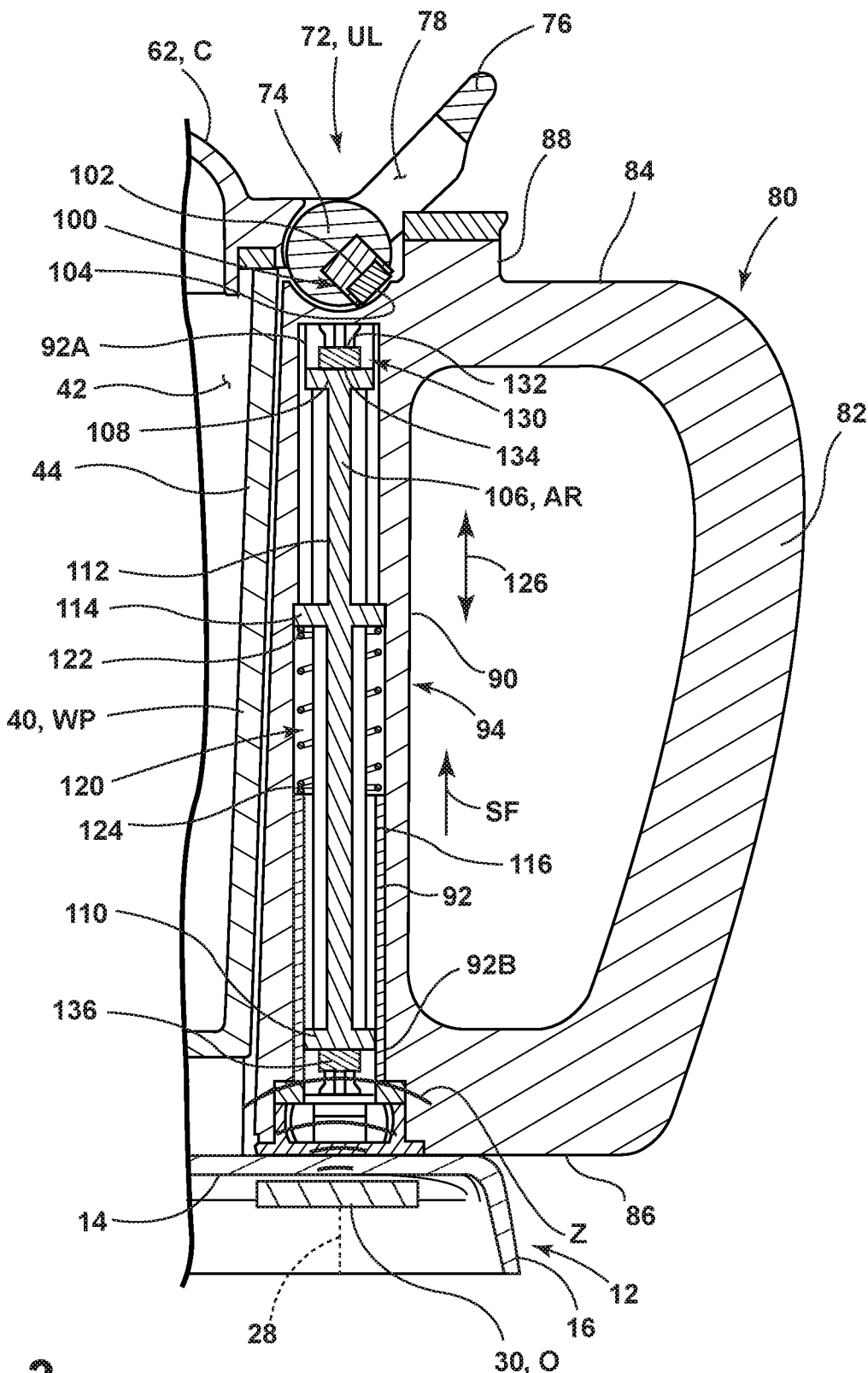
FIG. 3 is a close-up view of the interlock system of FIG. 1 taken at location III.

Referring now to FIG. 3, a close-up view of the handle assembly 80 and interlock system 94 of FIG. 1 is shown. The latch mechanism 72 is shown in the unlatched position UL and the cover assembly 62 is shown in the closed position C. The rotatable base portion 74 of the latch mechanism 72 is shown having a first magnetic member 100. The first magnetic member 100 is fixed to the rotatable base portion 74, such that the first magnetic member 100 moves between first and second positions as the latch mechanism 72 moves between latched and unlatched positions. With the latch mechanism 72 shown in the unlatched position UL, the first magnetic member 100 is in a first position relative to the interlock assembly 94. The first magnetic member 100 includes first and second sides 102, 104 which are contemplated to represent opposite poles of the first magnetic member 100 which is contemplated to be a dipole magnet. The first magnetic member 100 may be a permanent magnet or other magnetized material.

With further reference to FIG. 3, the sealed cavity 92 includes upper and lower portions 92A, 92B and is shown having a plunger member 106 disposed therein. The plunger member 106 includes first and second ends 108, 110 which are disposed on opposite sides of an elongate body portion 112. Along the body portion 112 of the plunger member 106, an engagement flange 114 outwardly extends into the sealed cavity 92. The sealed cavity 92 also includes an engagement flange 116 which extends inwardly into the sealed cavity 92. As further shown in FIG. 3, a biasing member 120 is shown in the form of a spring member having first and second ends 122, 124. As disposed within the sealed cavity 92, the first end 122 of the biasing member 120 abuts the engagement flange 114 of the plunger member 106. The second end 124 of the biasing member 120 abuts the engagement flange 116 in assembly. The biasing member 120 includes a spring force SF which biases the plunger member 106 upwardly to an at-rest position AR shown in FIG. 3. The plunger member 106 is configured for substantially vertical movement within the sealed cavity 92 in the direction as indicated by arrow 126. Movement of the plunger member 106 from the at-rest position AR to an actuated position AP (FIG. 4) is described below.

With further reference to FIG. 3, the first end 108 of the plunger member 106 includes an upper magnetic member 130 having first and second sides 132, 134. Much like the first magnetic member 100 disposed in the latch mechanism 72, the upper magnetic member 130 is contemplated to be a permanent magnet or other magnetizeable material having two poles with opposite polarity represented by the first and second sides 132, 134 thereof. The second side 104 of the first magnetic member 100 is contemplated to be a like pole relative to the first side 132 of the upper magnetic member 130. In this way, the first magnetic member 100 of the latch mechanism 72 and the upper magnetic member 130 of the plunger member 106 are configured to repel one another when aligned, as further described below. A lower magnetic member 136 is shown disposed on the second end 110 of the plunger member 106, so as to be disposed on an opposite side of the plunger member 106 relative to the upper magnetic member 130. In FIG. 3, the lower magnetic member 136 is shown disposed outside of the zone of detection Z emanating from the magnetically controlled switch 30 disposed within the housing 16 of the base unit 12 directly below the interlock system 94.

Figure 4:
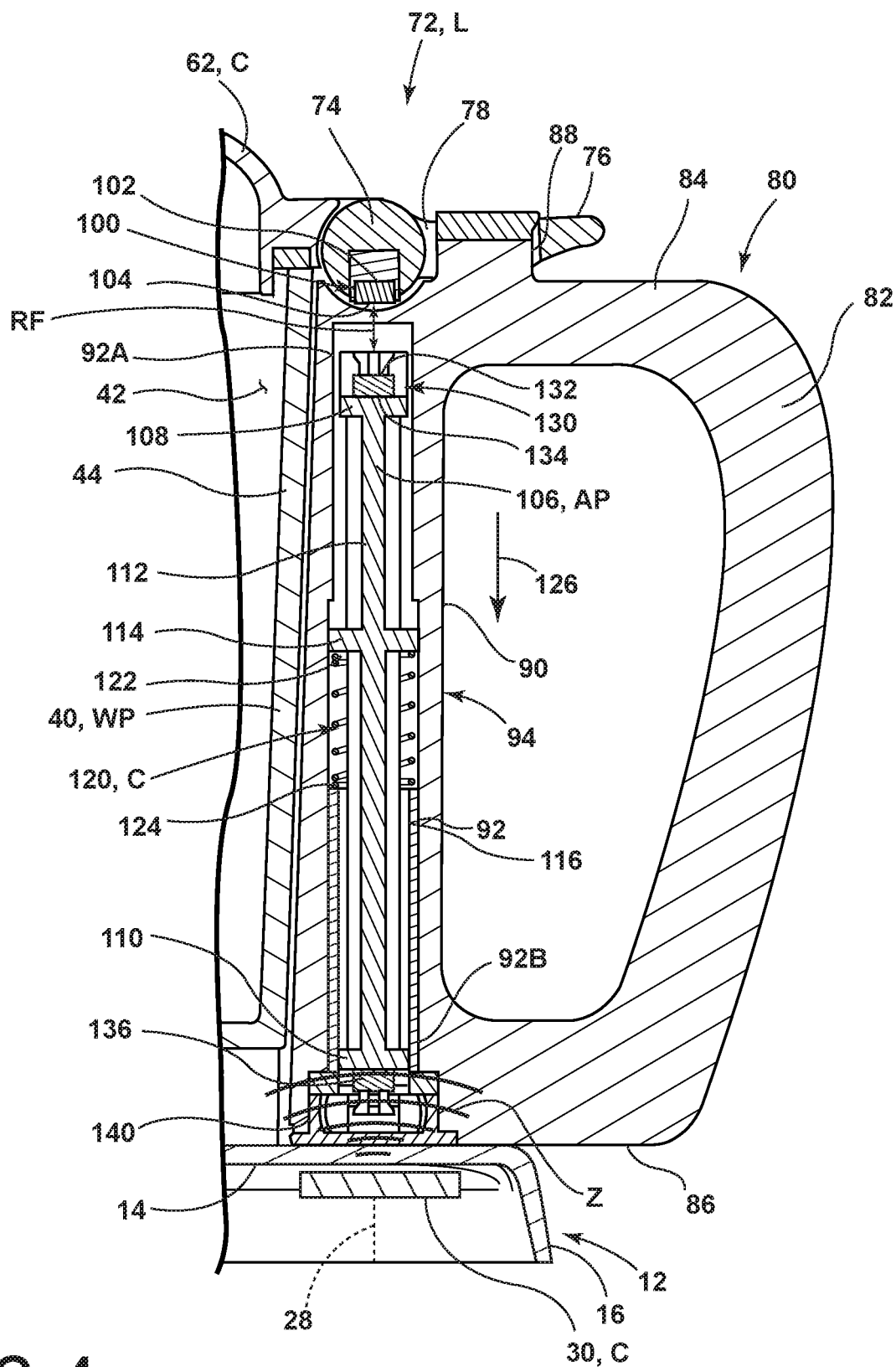
FIG. 4 is a close-up of the interlock system of FIG. 2 taken at location IV.

Referring now to FIG. 4, the latch mechanism 72 is shown in the latched position L, wherein the first magnetic member 100 has been rotated from the first position (FIG. 3) to a second position (FIG. 4). With the first magnetic member 100 of the latch mechanism 72 in the second position, the first magnetic member 100 is aligned with the upper magnetic member 130 of the plunger member 106. As noted above, the second side 104 of the first magnetic member has the same polarity as the first side 132 of the upper magnetic member 130. Thus, when the first magnetic member 100 is in the second position and aligned with the upper magnetic member 130 of the plunger member 106, the first magnetic member 100 and the upper magnetic member 130 repel one another under a repulsion force RF. The repulsion force between the first magnetic member 100 and the upper magnetic member 130 is contemplated to be greater than the upward spring force SF of the biasing member 120. In this way, when the first magnetic member 100 and the upper magnetic member 130 repel one another, the spring force SF is overcome by the repulsion force RF so that the plunger member 106 moves downward along the path as indicated by arrow 126 within the sealed cavity 92 to an actuated position AP (FIG. 4) from the at-rest position AR (FIG. 3). As the plunger member 106 moves downward within the sealed cavity 92, the lower magnetic member 136 moves to the lower portion 92B of the sealed cavity 92. The lower portion 92B of the sealed cavity 92 is shown disposed within the zone of detection Z of the magnetically controlled switch 30. Thus, when the lower magnetic member 136 moves to the lower portion 92B of the sealed cavity 92 and into the zone of detection Z of a magnetically controlled switch 30, the magnetically controlled switch 30 detects the applied magnetic field of lower magnetic member 136 to switch the magnetically controlled switch 30 from the open condition O (FIG. 3) to the closed condition C (FIG. 4). With the magnetically controlled switch 30 in the closed condition C, power is provided to the motor 22 (FIG. 1) for powering the food processing tool 46 within the food processing chamber 42.

As noted above, the cavity 92 is a sealed cavity, such that food particles and other ingredients are not introduced into the sealed cavity 92 during a food processing procedure. In this way, the interlock system 94 is a non-contact system that is protected from contaminants which provides for a reliable and consistent interlock system 94. The sealed cavity 92 can be accessed via a cavity cover 140 which may be a threaded member configured to engage the base portion 90 of the handle assembly 80 to close the lower portion 92B of the sealed cavity 92.

As shown in FIGS. 1-4, the interlock system 94 is disposed within a sealed cavity 92 that is positioned outside of and adjacent to the food processing chamber 42 of the container 40. The base portion 90 of the handle assembly 80, in which the interlock system 94 is disposed, may be an integral part of the container 40 that is injection molded together with the molding of the container 40.

With reference to FIGS. 1-4, the food processor 10 of the present concept is an appliance for processing food having a safety interlock system 94 that selectively controls access to power for the motor 22 of the food processor 10. The container 40 is contemplated to be a removeable container that can be removed from the base unit 12 at any time. When a user wishes to use the food processor 10, the container 40 is placed on the base unit 12 in a working position WP, wherein the working position WP includes the interlock system 94 being disposed directly above the magnetically controlled switch 30. With the container 40 in the working position WP and supported on the upper support surface 14 of the base unit 12, the cover assembly 62 is moved from an open position O to a closed position C. With the cover assembly 62 in the closed position C, the latch mechanism 72 is moved from an unlatched position UL (FIGS. 1 and 3) to a latched position L (FIGS. 2 and 4). With the latch mechanism 72 in the latched position L, the plunger member 106 moves to the actuated position AP (FIG. 4) from the at-rest position AR (FIG. 3). Again, movement of the plunger member 106 to the actuated position AP from the at-rest position AR is provided by the repulsion force RF between the first magnetic member 100 and the upper magnetic member 130. As the plunger member 106 moves to the actuated position AP, the lower magnetic member 136 moves into the zone of detection Z of the magnetically controlled switch 30 to switch the magnetically controlled switch 30 from the open condition O (FIG. 3) to the closed condition C (FIG. 4). In this way, an electric control circuit disposed within the base unit 12 can provide power to the motor 22 when the components of the food processor in the proper position for a food processing sequence, as further described below.

Figure 5:
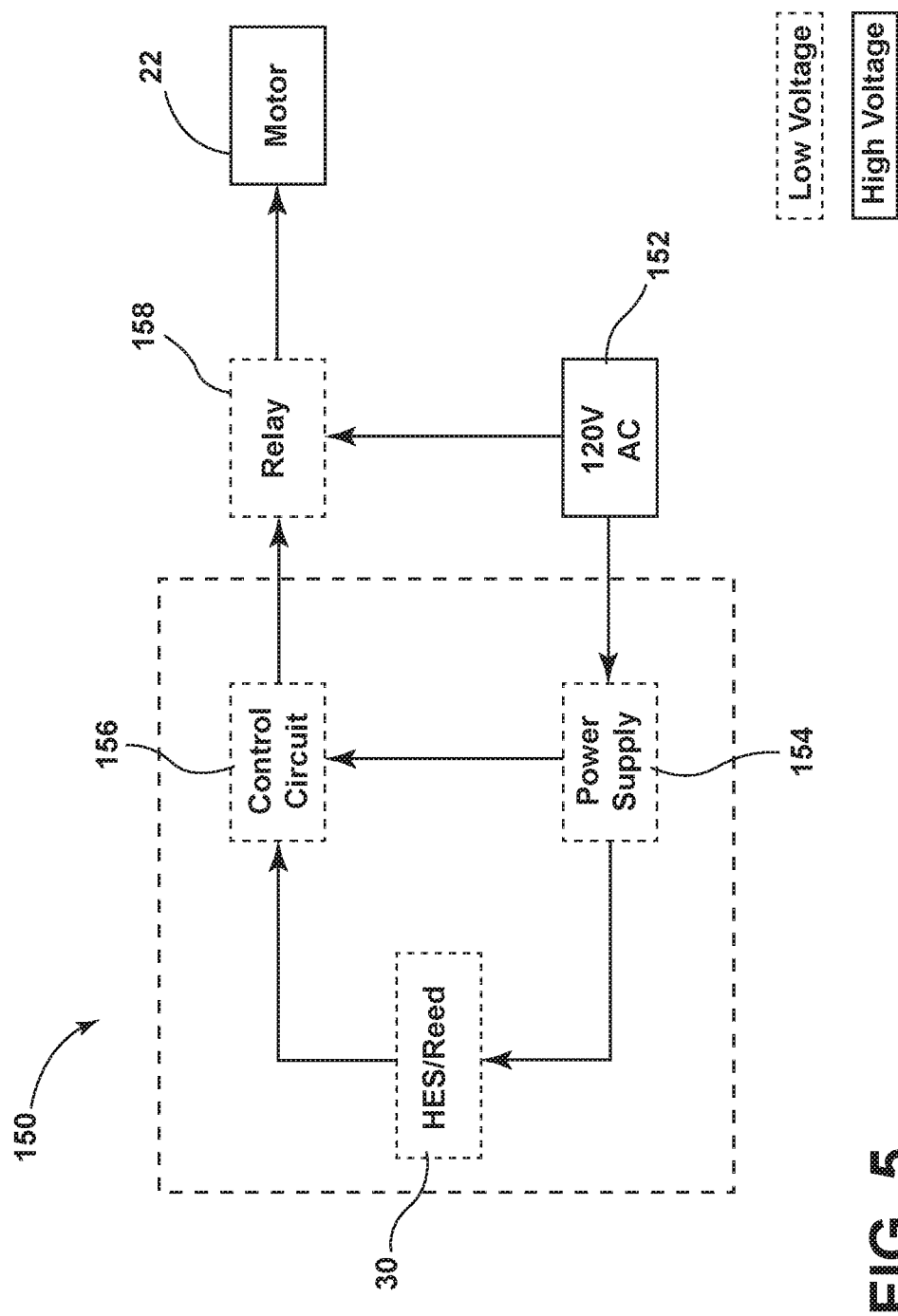
FIG. 5 is a diagram of an electric control for use with a food processor.

Referring now to FIG. 5, an electric control circuit 150 is shown, wherein a 120 volt AC power source 152 provides high voltage to a power supply 154. The power supply 154 is configured to convert the high voltage AC power from the power source 152 to a low voltage DC power for powering the magnetically controlled switch 30 and a control circuit 156. When the magnetically controlled switch 30 is closed using the interlock system 94 described above, the magnetically controlled switch 30 sends a signal to the control circuit 156 which utilizes power from the power supply 154 and the signal from the magnetically controlled switch 30 to energize a relay 158. The relay 158 provides the high voltage power from the power source 152 to the motor 22, such that the motor 22 can drive a food processing tool, such as food processing tool 46 shown in FIG. 1, within the food processing chamber 42. The electric control circuit 150 is contemplated to be disposed within the housing 16 of the base unit 12 of the food processor 10.

Referring now to FIG. 6, another embodiment of a food processor 10A is shown. The food processor 10A includes numerous features that are similar to or the same as various features found on the food processor 10 shown in FIGS. 1-4. As such, like reference numerals will be used to describe features that are common to both food processors 10, 10A. The food processor 10A is contemplated to have a base unit 12, a food processing tool 46, an interlock system 94 and an electric control circuit 150, much like food processor 10 described above. In FIG. 6, a latch mechanism 160 is shown in an unlatched position UL and a cover assembly 62 is shown in an open position O. The cover assembly 62 includes an outwardly extending flange 161 on which the latch mechanism 160 is disposed on an upper portion 161A thereof. A first magnetic member 162 is disposed in a lower portion 161B of the outwardly extending flange 161 of the cover assembly 62. Specifically, the first magnetic member 162 is disposed below the latch mechanism 160 and is operable between first and second positions as the cover assembly 62 moves vertically between open and closed positions O, C. With the cover assembly 62 in the slightly open position O and the latch mechanism 160 in the unlatched position UL, the first magnetic member 162 is in a first position relative to the interlock assembly 94. The first magnetic member 162 includes first and second sides 164, 166 which are contemplated to represent opposite poles of the first magnetic member 162 which is contemplated to be a dipole magnet. The first magnetic member 162 may be a permanent magnet or other magnetized material.

With further reference to FIG. 6, the outwardly extending flange 161 includes a recess 170. The latch mechanism 160 is pivotally coupled to the cover assembly 62 at pivot point P within the recess 170. The latch mechanism 160 includes a lever 172 having an upwardly extending upper tab 174 and a downwardly extending lower tab 178 with a substantially horizontal middle portion 176 disposed therebetween. The lever 172 is pivotally moveable from an at-rest position AR, as shown in FIG. 6, to a release position R when the upper tab 174 of the lever 172 is pushed inwardly in a direction as indicated by arrow 180. A spring member 182 is coupled between the lever 172 at middle portion 176 and the outwardly extending flange 161 at recess 170. The spring member 182 biases the lever 172 towards the at rest position AR. The downwardly extending lower tab 178 of the lever 172 includes an inwardly extending catch member 184 having an angled underside 186. The angled underside 186 is used to urge the lever 172 towards the release position R as the cover assembly 62 moves vertically downward to the closed position C (FIG. 7). The catch member 184 further includes a planar upper side 188 that is configured to abut a retainment flange 190 disposed within a recess 192 of the handle assembly 80 when the latch mechanism 160 is in the latched position L (FIG. 7).

As further shown in FIG. 6, the outwardly extending flange 161 includes a lower surface 194 having a downwardly extending engagement feature 196. In the embodiment shown in FIG. 6, the downwardly extending engagement feature 196 is shown as a rounded bulb that downwardly extends from the lower surface 194 of the outwardly extending flange 161. When the cover assembly 62 moves vertically from the open position O to the closed position C, the downwardly extending engagement feature 196 is configured to nest within a cradle 198 disposed in an upper portion of the handle assembly 80. The cradle 198 is shown disposed directly above the upper magnetic member 134 of the interlock assembly 94. Further, the first magnetic member 164 is disposed directly above the downwardly extending engagement feature 196 of the cover assembly 62. In this way, as the downwardly extending engagement feature 196 is received in the cradle 198, the cover assembly 62 is guided from the open position O to the closed position C, wherein the first magnetic member 162 is properly located directly above the interlock system 94 for activating the interlock system 94.

Referring now to FIG. 7, the latch mechanism 160 is shown in the latched position L and the cover assembly 62 is shown in the fully closed position C. With the latch mechanism 160 in the latched position L, the catch member 184 of the downwardly extending tab 178 is engaged with the retainment flange 190 of the handle assembly 80. In this way, the cover assembly 62 is retained in the closed position C on the container 40. The downwardly extending engagement feature 196 is shown engaged with and received in the cradle 198 of the handle assembly 80. Thus, with the latch assembly 160 in the latched position L and the cover assembly 62 in the closed position C, the first magnetic member 162 has moved vertically downward to a second position. Movement of the first magnetic member 162 from the first position (FIG. 6) to the second position is a downward movement towards the upper magnetic member 130 disposed on plunger member 106. With the first magnetic member 162 drawn near to the upper magnetic member 130, the repulsion forces RF between like poles of the first magnetic member 162 and the upper magnetic member 130 are applied therebetween to move the plunger member 106 downward in a direction as indicated by arrow 126, thereby overcoming any upward biasing forces applied to the plunger member 106. In this way, the downward movement of the cover assembly 62 to the closed position C provides for a movement of the plunger member 106 to provide detection of the lower magnetic member 136 (FIG. 4) by the magnetically controlled switch 30 within the zone of detection Z in a similar manner as described above with reference to food processor 10. In this way, the food processor 10A is prepared for use in a food processing sequence as an electronic control circuit has been closed and power is supplied to the motor 22 when the cover assembly 62 is in the closed position C and the latch mechanism 160 is in the latched position L.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food processing container, comprising:
   a base portion;
   a food processing chamber having an open top and a sidewall upwardly extending from the base portion;
   a cover assembly configured to close the open top of the food processing chamber;
   a latch mechanism pivotally coupled to the cover assembly and operable between latched and unlatched positions, the latch mechanism having a first magnetic member operable between first and second positions as the latch mechanism rotates between the latched and unlatched positions, respectively;
   an interlock assembly disposed outside of and adjacent to the food processing chamber, the interlock assembly comprising:
      a sealed cavity having upper and lower portions;
      a plunger member moveably disposed within the sealed cavity and having first and second ends, the plunger member operable between at-rest and actuated positions within the sealed cavity;
      an upper magnetic member disposed on the first end of the plunger member;
      a lower magnetic member disposed on the second end of the plunger member; and
   wherein the plunger member moves to the actuated position as the latch mechanism rotates downwardly from the unlatched position to the latched position due to a repulsion force between the first magnetic member and the upper magnetic member, and further wherein the lower magnetic member moves into the lower portion of the sealed cavity as the latch mechanism rotates downwardly from the unlatched position to the latched position.

2. The food processing container of claim 1, wherein the cover assembly is hingedly coupled to the sidewall of the food processing chamber between open and closed positions.

3. The food processing container of claim 1, including:
   a biasing member disposed within the sealed cavity and abutting the plunger member to bias the plunger member to the at-rest position.

4. The food processing container of claim 3, wherein the biasing member biases the plunger member towards the at-rest position.

5. The food processing container of claim 1, including;
   a cavity cover operably coupled to the lower portion of the sealed cavity for providing access to the sealed cavity.

6. The food processing container of claim 1, including:
   a handle assembly extending outwardly from the sidewall of the food processing chamber, wherein the latch mechanism couples to a portion of the handle assembly when the latch mechanism is in the latched position.

7. An appliance for processing food, comprising:
a base unit having a housing with an upper support surface;
a motor disposed within the housing of the base unit;
an electric control circuit for the motor disposed within the housing for the base unit, the electric control circuit having a magnetically controlled switch with a detection zone extending outside of the base unit;
a container having a base portion and a food processing chamber, wherein the base portion is supported on the upper support surface of the base unit when the container is positioned in a working position on the base unit;
a cover assembly for covering the food processing chamber, the cover assembly including a latch mechanism having a first magnetic member operable between first and second positions as the latch mechanism moves between latched and unlatched positions, respectively;
a sealed cavity adjacent the food processing chamber;
a plunger member disposed within the sealed cavity having first and second ends, the plunger member operable between at-rest and actuated positions within the sealed cavity;
an upper magnetic member disposed on the first end of the plunger member;
a lower magnetic member disposed on the second end of the plunger member;
wherein the plunger member moves to the actuated position as the latch mechanism moves to the latched position due to a repulsion force between the first magnetic member of the latch mechanism and the upper magnetic member of the plunger member, and further wherein the lower magnetic member moves into the detection zone of the magnetically controlled switch to close the switch and the electric control circuit when the plunger member is in the actuated position; and
a handle assembly extending outwardly from a sidewall of the food processing chamber and having an engagement member outwardly extending from an upper portion thereof.

8. The appliance for processing food of claim 7, wherein the latch mechanism includes a recess, and further wherein the engagement member outwardly extending from the upper portion of the handle assembly is received in the recess of the latch mechanism when the latch mechanism is in the latched position.

9. The appliance for processing food of claim 7, wherein the latch mechanism includes a rotating base portion having the first magnetic member disposed therein.

10. The appliance for processing food of claim 7, including:
a biasing member disposed within the sealed cavity, the biasing member biasing the plunger member towards the at-rest position.

11. The appliance for processing food of claim 10, wherein the biasing member is a spring member having a spring force, and further wherein the repulsion force between the first magnetic member and the upper magnetic member overcomes the spring force of the spring member to move the plunger member to the actuated position when the latch mechanism is in the latched position.

12. An appliance for processing food, comprising:
a base unit having a housing;
a motor disposed within the housing of the base unit;
an electric control circuit for the motor disposed within the housing for the base unit, the electric control circuit having a magnetically controlled switch with a detection zone extending outside of the base unit;
a container having a food processing chamber defined by a sidewall and a handle assembly extending outwardly from the sidewall, wherein the handle assembly includes a sealed cavity disposed above the magnetically controlled switch when the container is positioned in a working position on the base unit;
a cover assembly for covering the food processing chamber, the cover assembly operable between open and closed positions relative to the food processing chamber and having a first magnetic member operable between first and second positions as the cover assembly moves vertically between open and closed positions, respectively;
a latch mechanism pivotally coupled to the cover assembly for rotation between latched and unlatched conditions, wherein the latch mechanism includes an inwardly extending catch member that engages a retainment flange disposed within a recess of the handle assembly when the latch mechanism is in the latched condition;
a plunger member disposed within the sealed cavity having upper and lower magnetic members disposed on opposite ends thereof, the plunger member operable between at-rest and actuated positions within the sealed cavity; and
wherein the first magnetic member of the cover assembly aligns with the upper magnetic member of the plunger when the cover assembly is in the closed position, and further wherein the first magnetic member of the cover assembly repels the upper magnetic member of the plunger member under a repulsion force to move the plunger to the actuated position within the sealed cavity, wherein the lower magnetic member moves into the detection zone of the magnetically controlled switch to close the switch and the electric control circuit when the plunger member is in the actuated position.

13. The appliance for processing food of claim 12, wherein the container includes a first locking feature.

14. The appliance for processing food of claim 13, wherein the base unit includes a second locking feature configured to engage the first locking feature of the container when the container is positioned in the working position on the base unit.

15. The appliance for processing food of claim 12, including:
a biasing member disposed within the sealed cavity, the biasing member biasing the plunger member towards the at-rest position.

16. The appliance for processing food of claim 15, wherein the biasing member is a spring member having a spring force.

17. The appliance for processing food of claim 16, wherein the repulsion force between the first magnetic member and the upper magnetic member is greater than the spring force of the spring member.

* * * * *